United States Patent
Verma et al.

(10) Patent No.: US 11,895,134 B2
(45) Date of Patent: Feb. 6, 2024

(54) SECURING APPLICATIONS THROUGH SIMILARITY-BASED RISK ASSESSMENT

(71) Applicant: SAP SE, Walldorf (DE)

(72) Inventors: Sudhir Verma, Gurgaon (IN); Ayushi Singla, Haryana (IN); Sumit Kumar, Jharkhand (IN); Sarma Adithe Venkata Ram, Fremont, CA (US); Jani Mahammad, Fremont, CA (US)

(73) Assignee: SAP SE, Walldorf (DE)

( * ) Notice: Subject to any disclaimer, the term of this patent is extended or adjusted under 35 U.S.C. 154(b) by 249 days.

(21) Appl. No.: 17/228,118

(22) Filed: Apr. 12, 2021

(65) Prior Publication Data

US 2022/0329612 A1    Oct. 13, 2022

(51) Int. Cl.
*H04L 67/50* (2022.01)
*H04L 9/40* (2022.01)

(52) U.S. Cl.
CPC ........ *H04L 63/1425* (2013.01); *H04L 63/105* (2013.01); *H04L 63/1433* (2013.01); *H04L 63/1441* (2013.01); *H04L 63/168* (2013.01); *H04L 67/535* (2022.05)

(58) Field of Classification Search
CPC . H04L 63/1425; H04L 67/535; H04L 63/105; H04L 63/1433; H04L 63/1441; H04L 63/168
See application file for complete search history.

(56) References Cited

U.S. PATENT DOCUMENTS

| | | |
|---|---|---|
| 8,769,412 B2 | 7/2014 | Gill et al. |
| 8,812,342 B2 | 8/2014 | Barcelo et al. |
| 10,152,557 B2 | 12/2018 | Banadaki et al. |
| 11,698,990 B2 * | 7/2023 | McFall ............. G06F 21/78 726/26 |
| 11,700,250 B2 * | 7/2023 | Johnson ............. H04L 63/18 726/22 |
| 2009/0265199 A1 | 10/2009 | Moerdler et al. |
| 2010/0324952 A1 | 12/2010 | Bastos et al. |

(Continued)

OTHER PUBLICATIONS

Alpcan et al., "Modeling Dependencies in Security Risk Management," *2009 Fourth International Conference on Risks and Security of Internet and Systems (CRiSIS)*, 4 pages (Sep. 2009).

(Continued)

*Primary Examiner* — Stephen T Gundry

(74) *Attorney, Agent, or Firm* — Klarquist Sparkman, LLP

(57) ABSTRACT

Systems, methods, and computer media are described for user risk assessment using similarity analysis. Records of transactions performed by a user while in previous enhanced application access sessions can be evaluated against records of transactions performed by other users in previous sessions. The more similar a user is to other users, the more likely it is the user was acting in a typical manner, and the less likely the user poses a security risk. A similarity analysis can be performed using a bipartite graph linking a group of users and a group of application transactions. By examining an edge between a user and a performed transaction, other edges (and corresponding other users) can be identified that also performed the transaction. A similarity score can be calculated based on the bipartite graph and can be used to determine a risk classification and allow or deny an enhanced application access session request.

19 Claims, 8 Drawing Sheets

(56) References Cited

U.S. PATENT DOCUMENTS

| | | | |
|---|---|---|---|
| 2014/0359777 A1* | 12/2014 | Lam | G06F 21/577 |
| | | | 726/25 |
| 2017/0063910 A1 | 3/2017 | Muddu et al. | |
| 2017/0206276 A1* | 7/2017 | Gill | G06F 16/285 |
| 2017/0251013 A1* | 8/2017 | Kirti | H04L 63/1441 |
| 2018/0139227 A1* | 5/2018 | Martin | H04L 63/1433 |
| 2018/0278614 A1* | 9/2018 | Miller | G06F 21/604 |
| 2020/0021607 A1* | 1/2020 | Muddu | H04L 63/06 |
| 2020/0110882 A1* | 4/2020 | Ripolles Mateu | G06F 16/353 |
| 2020/0356676 A1* | 11/2020 | Gorlamandala | G06N 20/00 |
| 2021/0209229 A1* | 7/2021 | Wu | G06F 16/285 |
| 2021/0250361 A1* | 8/2021 | Leibmann | H04L 63/105 |
| 2021/0400049 A1* | 12/2021 | Denning | H04L 63/0838 |
| 2022/0086179 A1* | 3/2022 | Levin | H04W 12/63 |
| 2022/0116782 A1* | 4/2022 | Sabah | H04W 12/37 |
| 2022/0131844 A1* | 4/2022 | Sherlock | H04L 63/1433 |
| 2022/0141180 A1* | 5/2022 | Bhasin | H04L 69/40 |
| | | | 726/1 |
| 2022/0210168 A1* | 6/2022 | Yavo | H04L 63/1433 |
| 2022/0237102 A1* | 7/2022 | Bugdayci | G06F 11/3495 |
| 2022/0368726 A1* | 11/2022 | Balasubramaniam | |
| | | | H04L 63/1441 |
| 2022/0377093 A1* | 11/2022 | Crabtree | H04L 43/045 |
| 2022/0382844 A1* | 12/2022 | Keith, Jr. | A61B 5/7264 |
| 2022/0385458 A1* | 12/2022 | Keith, Jr. | A61B 5/0077 |
| 2022/0400130 A1* | 12/2022 | Kapoor | G06F 16/9537 |
| 2022/0405580 A1* | 12/2022 | Zheng | G06F 18/24147 |
| 2023/0005579 A1* | 1/2023 | Robbins | H04L 63/0861 |
| 2023/0032686 A1* | 2/2023 | Williams | G06F 16/9535 |
| 2023/0045774 A9* | 2/2023 | Gunther | G06F 16/27 |
| 2023/0047653 A1* | 2/2023 | Beaumont | G06F 21/552 |
| 2023/0054446 A1* | 2/2023 | LaFever | H04W 12/75 |
| 2023/0106024 A1* | 4/2023 | Keith, Jr. | A61B 5/4818 |
| | | | 726/5 |
| 2023/0107624 A1* | 4/2023 | Keith, Jr. | G06F 21/32 |
| | | | 704/249 |
| 2023/0114650 A1* | 4/2023 | Keith, Jr. | G06F 21/316 |
| | | | 726/7 |
| 2023/0129776 A1* | 4/2023 | Agarwal | H04L 47/82 |
| | | | 726/3 |
| 2023/0132635 A1* | 5/2023 | Cervantez | G06Q 20/4016 |
| | | | 705/318 |

OTHER PUBLICATIONS

SAP Press, "An Introduction to SAP GRC Access Control," *SAP Press Blog*, 14 pages (Oct. 2019).

Tavares et al., "Leveraging Anomaly Detection in Business Process with Data Stream Mining," *ISYS—Brazilian Journal of Information Systems*, vol. 12, No. 1, pp. 54-75 (Apr. 2019).

* cited by examiner

SECURING APPLICATIONS THROUGH SIMILARITY-BASED RISK ASSESSMENT

BACKGROUND

Organizations of all sizes typically assign various levels of application permissions or access to different users or user types. In some cases, it is useful to temporarily allow a particular user to have enhanced application access that temporarily provides more permissions or access to additional data or functionality. Such expanded access, however, can introduce security risks.

DETAILED DESCRIPTION

The examples described herein generally assess risk in granting users enhanced application access. Users of applications and computing systems typically are provided a certain level of access and certain permissions based on the role of the user and denied access to other features or permissions. For example, a user employed by an entity whose job is data entry or inventory management does not necessarily need access to profile information about other users, detailed financial or tax information for the entity, etc.

In some situations, however, it can be desirable to temporarily grant enhanced access (e.g., expanded permissions, access to additional functionality or data, etc.) to certain users. Such situations can be referred to as privilege access management (PAM) or emergency access management (EAM) sessions. For example, various deadlines (regulatory reporting, quarterly analyses, etc.) might entail a large amount of effort, and temporarily allowing some users enhanced access can help ease the burden. Allowing users enhanced access, however, introduces security risks. A user who is granted enhanced access to help with a quarterly financial deadline, for example, may also be able to access other information such as user profile information or client payment information.

Conventionally, users are evaluated against certain static rules (which can vary among organizations) and/or are manually vetted and approved before enhanced access is granted. For example, enhanced access could be allowed after a user has been with an organization for a certain amount of time (e.g., six months, two years, etc.). Such conventional approaches to risk management can be overly simplistic, allowing potentially malicious users access to sensitive information, or time-intensive and inefficient.

The examples described herein assess risk through a similarity analysis. Records of transactions performed by the user while in past enhanced application access sessions can be evaluated against records of transactions performed by other users. The more similar a user is to other users, the more likely it is the user was acting in a normal, non-malicious manner, and the less risky the user can be considered. Conversely, if the user is one of the only users accessing certain data or performing a certain function (e.g., accessing profile information or downloading certain information), the user may be acting maliciously and can be considered riskier.

Figure 2:
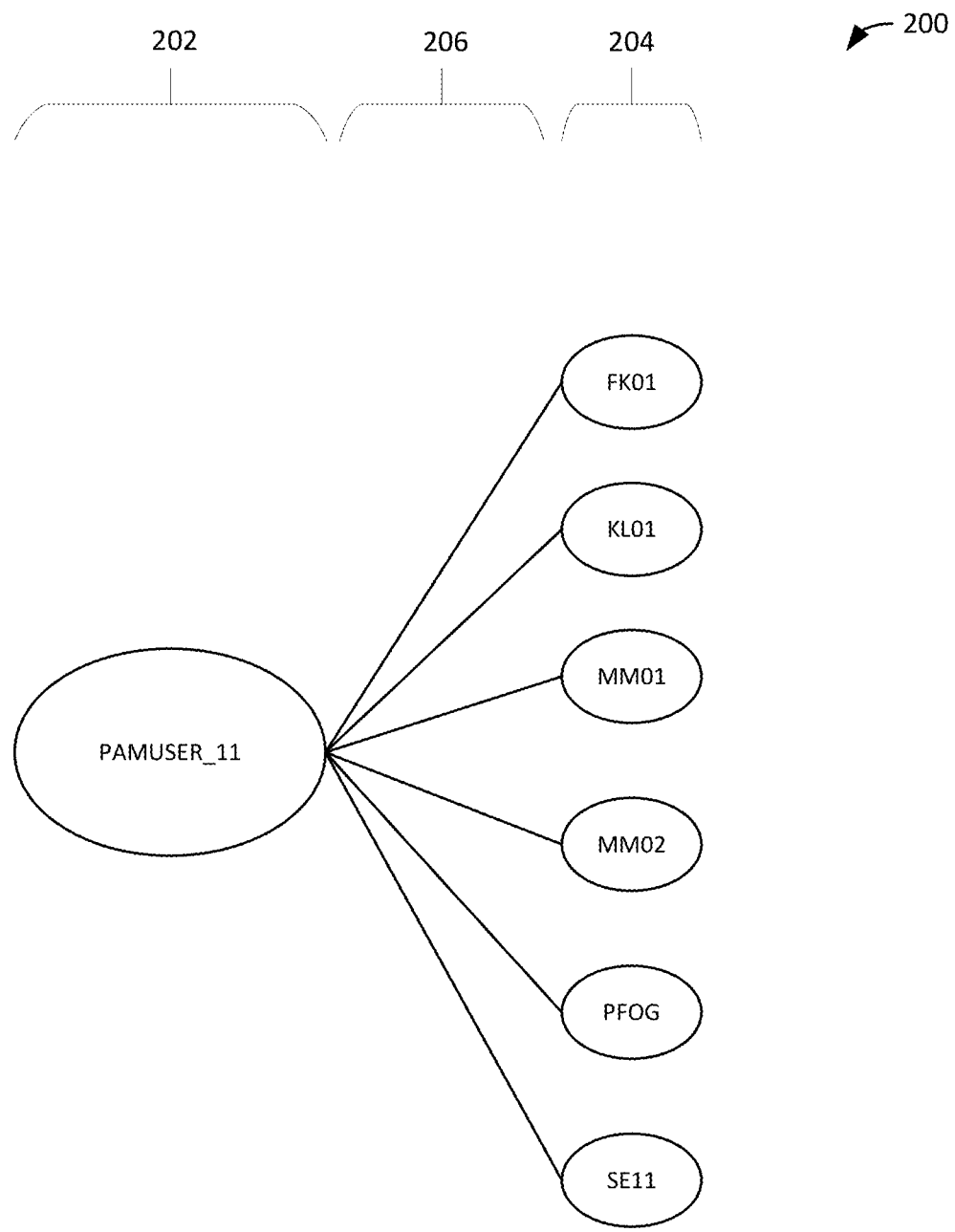
FIG. 2 illustrates an example bipartite graph connecting a single user to the user's application transactions.
Figure 3:
FIG. 3 illustrates an example bipartite graph connecting a group of users to various application transactions.

A similarity analysis can be performed using a bipartite graph. A bipartite graph is a graph in which two independent sets of nodes (also referred to as vertices) are connected through edges. As an example, users can each be a node in one set, different application transactions performed in enhanced application sessions can each be nodes in a second set, and edges of the bipartite graph can connect users with the transactions they have performed. Examples of such bipartite graphs are shown in FIGS. 2 and 3. By examining an edge between a user being assessed and a performed transaction, other edges (and corresponding other users) can also be identified that performed the transaction, allowing users with similar transaction records to be identified.

Through various similarity scoring approaches, the bipartite graph can be analyzed, and a similarity score can be calculated between the transactions performed by a user relative to transactions performed by other users (also referred to as the similarity between two users). In an example with users A, B, C, D, E, F, and G, similarity scores can be calculated for A compared to B, A compared to C, A compared to D, etc.

In some examples, if a user is less similar than a threshold (e.g., when compared against other users, no result is greater than 50% similar), the user can be classified as a security risk. Similarly, if a user is more than 50% similar to another user, the user is not classified as a security risk.

In some cases, however, multiple potentially malicious users might be present. Returning to the example of users A, B, C, D, E, F, and G, if A is found to be similar to B but dissimilar to the remaining users, it is possible that A and B should both be classified as security risks. To account for this possibility, in some examples, similarity scores with respect to multiple other users can be combined (e.g., a top "k" users can be averaged). Thus, if user B is 80% similar to user A, and users C and D are the next highest at 32% and 30%, these three scores (k=3) can be averaged to 47.3%, which falls below the example threshold of 50%. Under this approach, user A is now classified as a security risk whereas comparison to only the highest similar score results in user A not being classified as a security risk.

Based on the risk classification, a recommendation can be generated to either approve or deny an enhanced application session request for the user. The recommendation can be part of a notification or sent as an alert, email, text, or other message to a responsible party. In some examples, the request is automatically or conditionally approved or denied (e.g., still requires manual confirmation).

Examples are described below with reference to FIGS. 1-8.

Figure 1:
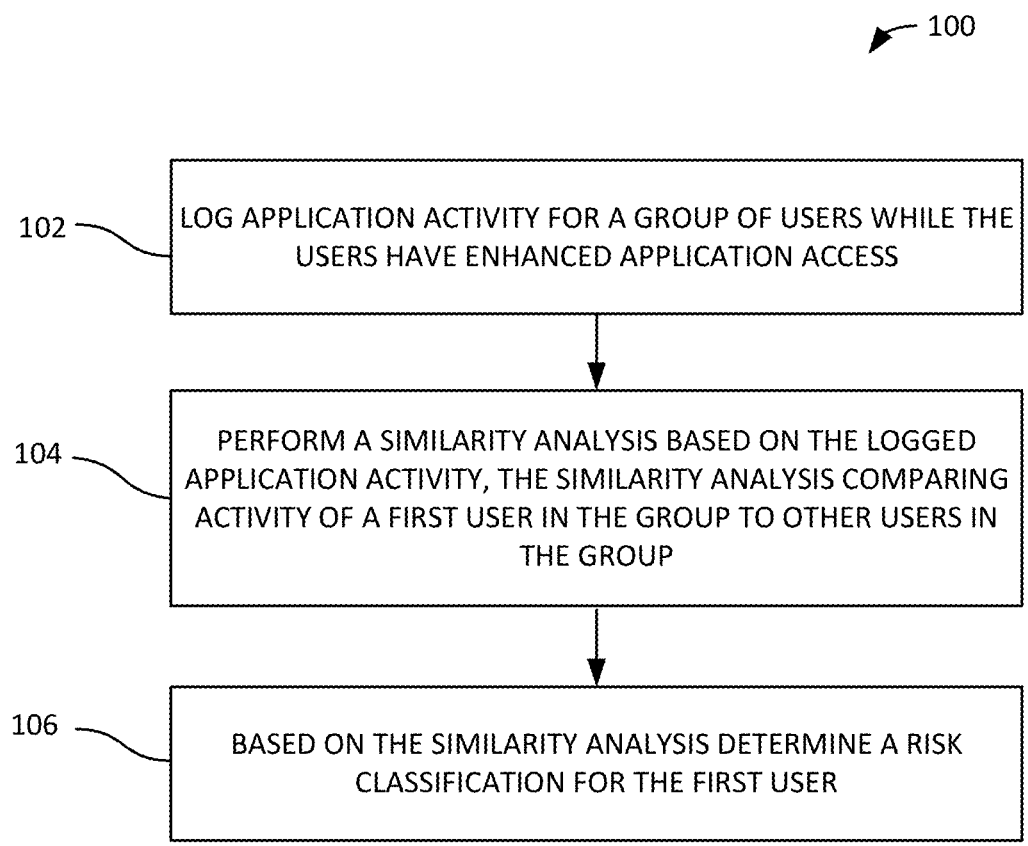
FIG. 1 illustrates an example method of assessing user risk through a similarity analysis.

FIG. 1 illustrates a method 100 of assessing user risk. In process block 102, application activity is logged for a group of users while the users have enhanced access to one or more applications. In some examples, every application transaction is logged for each user while the user has enhanced access (also referred to herein as privilege access management (PAM) sessions). In some examples, some routine transactions are omitted. An example log is shown below in Table 1.

TABLE 1

Example PAM Session Activity Log

| Session ID | Username | Role | Transaction | Date | System |
|---|---|---|---|---|---|
| 1 | PAMUSER_11 | BR12 | FK01 | Feb. 7, 2021 | System20 |
| 1 | PAMUSER_11 | BR12 | KL01 | Feb. 7, 2021 | System20 |
| 1 | PAMUSER_11 | BR12 | MM01 | Feb. 7, 2021 | System20 |
| 1 | PAMUSER_11 | BR12 | MM02 | Feb. 7, 2021 | System20 |
| 1 | PAMUSER_11 | BR12 | PFCG | Feb. 7, 2021 | System20 |
| 1 | PAMUSER_11 | BR12 | SE11 | Feb. 7, 2021 | System20 |
| ... | ... | ... | ... | ... | ... |
| 17 | PAMUSER_08 | BROTEST1 | MM02 | Feb. 7, 2021 | System30 |
| 17 | PAMUSER_08 | BROTEST1 | SM19 | Feb. 7, 2021 | System30 |

Table 1 includes a record for each transaction and includes the user, the user's role (e.g. role in a company, such as "manager," department, unit, etc.), a transaction identifier indicating the transaction type (e.g., FK01, KL01, etc.), date, and system from which the transaction was performed. The role identifiers specify the types of transactions that a user in that role can perform. The example username formats, role identifiers, and transaction identifiers can be defined for each application implementation (e.g., by each entity, company, organization, etc.), and the identifier types shown in Table 1 are simply for illustration. The row in Table 1 between session IDs 1 and 17 indicates that other transactions for other users are also included but not shown. In some examples, more information or less information is logged.

In some examples, the information in Table 1 is aggregated/consolidated by user, as shown in Table 2.

TABLE 2

Example Aggregated Log

| Session ID | Username | Role | Transactions |
|---|---|---|---|
| 1 | PAMUSER_11 | BR12 | FK01, KL01, MM01, MM02, PFCG, SE11 |
| 2 | PAMUSER_01 | BROTEST1 | XD01, XK01, XK02, SM31 |
| 3 | P000011 | BR12 | XD01, XK01, XK02 |
| 4 | PAMUSER_09 | BROTEST1 | KL01, SE11, SE16, SE16N, SM19, SM30, SM31 |
| 5 | P000011 | BROTEST1 | XD01, XK01, XK02 |
| 6 | P000011 | BROTEST1 | XD01, XK01, XK02 |
| 7 | PAMUSER_02 | BROTEST1 | MM01, MM02, XK02 |
| 8 | P000002 | BROTEST1 | MM01, SM31, SM49, SE11, SU01 |
| 9 | PAMUSER_10 | BROTEST1 | PFCG, SE11, SE16, SE16N, SM19, SM30, SM31, SM49, SU01, SU3, VD01 |
| 10 | PAMUSER_06 | BROTEST1 | FK01, MM01, MM02 |
| 11 | PAMUSER_03 | BROTEST1 | MM02, VD01 |
| 12 | PAMUSER_07 | BROTEST1 | KL01, MM01, MM02 |
| 13 | PAMUSER_04 | BROTEST1 | SE16, SM31 |
| 14 | P000011 | BROTEST1 | XD01, XK01, XK02 |
| 15 | PAMUSER_12 | IAGTEST | MM01, SE11, VD01, VD02, XD01, XK01, XK02 |
| 16 | PAMUSER_05 | BROTEST1 | SM31, SU01 |
| 17 | PAMUSER_08 | BROTEST1 | MM01, MM02, SMI9 |

Table 2 includes the session ID, username, role, and transaction identifiers for each user. In some examples, other information is included or omitted from the aggregated log shown in Table 2. In Table 1, six individual records are included for "PAMUSER_11" for each of transactions "FK01," "KL01," "MM01," "MM02," "PFCG," and "SE11." In Table 2, there is a single entry for "PAMUSER_11" containing all six transaction identifiers. As with the role identifiers and transaction identifiers, the format of usernames is defined by the organization implementing the application, and the usernames shown in Tables 1 and 2 such as "P000011" and "PAMUSER_12" are simply examples. Application activity can be automatically logged and stored in log files, database tables, or other formats. In some examples, application activity is periodically consolidated into an aggregated log as shown in Table 2. In other examples, aggregation occurs upon risk being assessed for a user. In other examples, an aggregated log is not determined and the raw log information (e.g., shown in Table 1) is used.

In process block 104, a similarity analysis is performed based on the logged application activity. The similarity analysis compares application activity of a first user in the group and application activity of other users in the group. The more similar a user is to other users, the more likely it is the user was acting in a normal, non-malicious manner, and the user can be classified as low risk. Conversely, if the user is one of the only users accessing certain data or performing a certain function (e.g., accessing profile information or downloading certain information), the user may be acting maliciously and can be classified as high risk. In some examples, additional classifications having multiple categories (such as low, moderate, and high risk) are used. In other examples, a binary classification is used (high/low risk or is/is not a risk).

The similarity analysis can be performed using a bipartite graph, in which two independent sets of nodes are connected through edges. FIG. 2 illustrates a simple example of a bipartite graph 200. Bipartite graph 200 represents the information found in Tables 1 and 2 for user "PAMUSER_11." A first set of nodes 202 representing users (in this case, one node and one user) is connected to a second set of nodes 204 representing transactions through a set of edges 206.

FIG. 3 illustrates a bipartite graph 300 in which the first set of nodes 302, representing users, is expanded to include the other users in Table 2. The users in the first set of nodes 302 are connected to a second set of nodes 304, representing transactions, through edges 306. Using bipartite graph 300, if a user has performed a particular transaction (the user node is connected to the transaction node through an edge), additional users who have performed the same transaction can be identified by following a different edge to a different user from the transaction node.

Based on the bipartite graph, a numerical similarity score can be calculated using various similarity rank approaches known in, for example, graph theory. Such approaches include the "simrank_similarity" algorithm available through the NetworkX library in which two objects are considered to be similar if they are referenced by similar objects. Other example similarity approaches include "simrank_similarity_numpy" and "graph_edit_distance," also available through the NetworkX library.

In process block 106, a risk classification is determined for the first user based on the similarity analysis. The risk classification can be determined by comparing a highest similarity score against a threshold to determine if a user is "similar enough" to another user. The similarity threshold can be set to any amount and can be determined through experience as a level that identifies risky users while at the same time limiting false identification of risk users. Example thresholds include 40%, 45%, 50%, 55% similar, etc. Other thresholds are also possible.

In some examples, multiple thresholds are used, such as low risk above 60% similarity, moderate risk above 45% but below 60%, and high risk below 45%. Similarly, risk can be classified numerically as 1-3, 1-4, 1-5, 1-10, etc., with corresponding thresholds.

Using the information shown in Tables 1 and 2 and FIGS. 2 and 3, the following similarity scores (top matching score shown in Table 3 below) can be calculated using the "simrank_similarity" approach:

TABLE 3

Example Similarity Scores

| Username | Highest Similarity Score with Another User |
|---|---|
| P000011 | 0.5421360001954189 |
| PAMUSER_01 | 0.5421360001954187 |
| PAMUSER_04 | 0.5385250249869338 |
| PAMUSER_05 | 0.5385250249869338 |
| PAMUSER_06 | 0.5100847826385002 |
| PAMUSER_07 | 0.5100847826385002 |
| P000002 | 0.4860124709127170 |
| PAMUSER_08 | 0.4847897457617964 |
| PAMUSER_09 | 0.4775329736368747 |
| PAMUSER_12 | 0.4706103135062336 |
| PAMUSER_11 | 0.4661178613450231 |
| PAMUSER_10 | 0.4549522488786541 |
| PAMUSER_03 | 0.4416477601385367 |

In Table 3, PAMUSER_03 and PAMUSER_10 scored the lowest, meaning those users are less similar to another user than any other user is. Inspection of the transactions made by those users (as shown in Table 2) indicates that MMO2 and VD01 transactions are associated with both PAMUSER_03 and PAMUSER_10 but seldom occur for other users. Also, PAMUSER_10 performed a large number of transactions and thus appears dissimilar to other users. If comparing against a threshold of 45% similarity, PAMUSER_03 would be classified as high risk.

Figure 4:
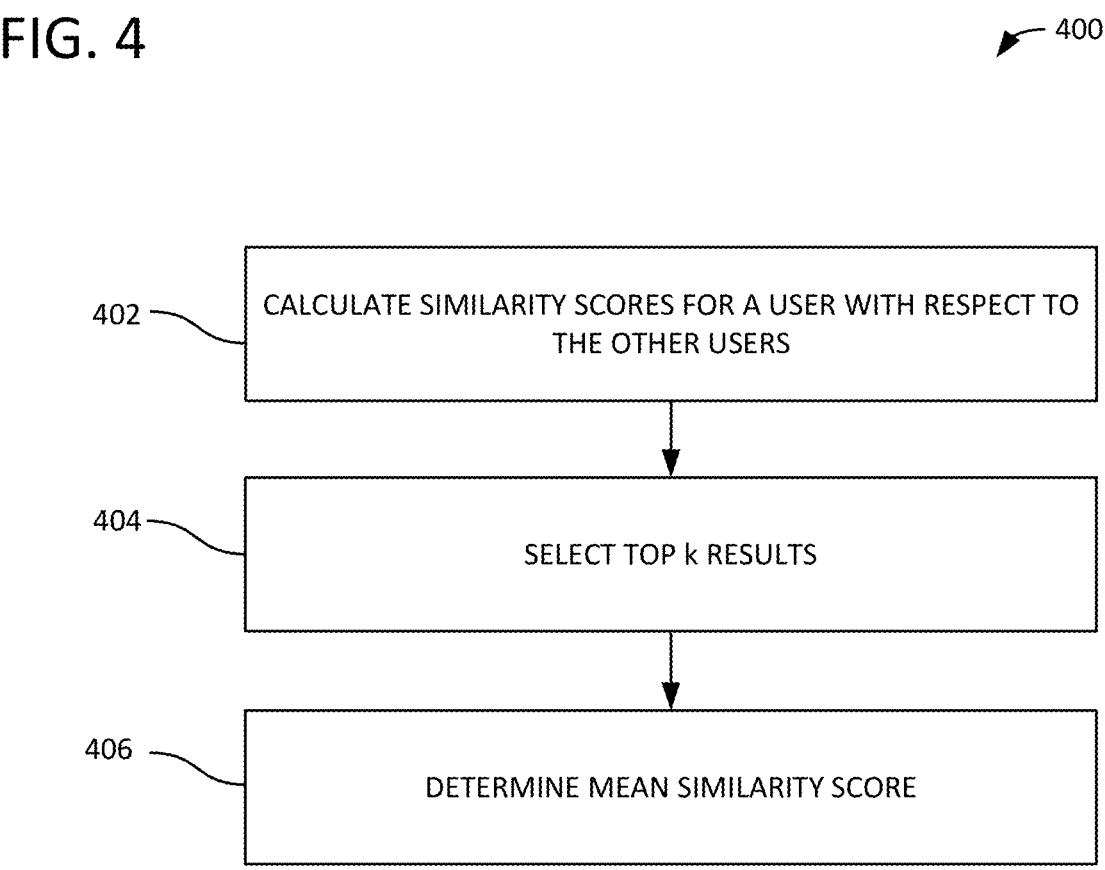
FIG. 4 illustrates an example method of calculating a mean similarity score.

In some cases, however, multiple potentially malicious/high risk users might be present, and the malicious users might not be identified because they are similar to each other. FIG. 4 illustrates a method 400 for combining multiple similarity scores to assess risk for a user. In process block 402, similarity scores for a user with respect to each of the other users are calculated. In process block 404, the top "k" results are selected (e.g., k=2, 3, 4, 5, etc.). In process block 406, the mean similarity score based on the top k results is determined.

Continuing with the example illustrated in Tables 1 and 2 and FIGS. 2 and 3, for PAMUSER_12, Table 4 shows the similarity scores calculated with respect to the other users.

TABLE 4

Example Similarity Scores with Respect to PAMUSER_12

| Username | Similarity Score With Respect to PAMUSER_12 |
|---|---|
| P0000011 | 0.4706103135062336 |
| PAMUSER_01 | 0.4261379673008358 |
| PAMUSER_02 | 0.3851718915933033 |
| PAMUSER_03 | 0.3634648512063400 |
| P000002 | 0.3341000393169905 |
| PAMUSER_06 | 0.3271581775421044 |
| ... | ... |

The mean of the similarity scores of the four closest users can be calculated and used as the similarity score for PAMUSER_12 ((0.4706103135062336+0.4261379673008358+0.3851718915933033+0.3634648512063400)/4=0.4113462559016782).

Table 5 below illustrates values for the remaining users applying the top-k mean (averaging) approach illustrated in FIG. 4 and Table 4.

TABLE 5

Example Mean Similarity Scores

| Username | Mean Similarity Score |
|---|---|
| PAMUSER_06 | 0.4948935475434479 |
| PAMUSER_07 | 0.4889684418580588 |
| PAMUSER_04 | 0.4841048097975027 |
| PAMUSER_05 | 0.4829597543491062 |
| PAMUSER_08 | 0.4722805687744031 |
| PAMUSER_02 | 0.4650638946040764 |
| PAMUSER_09 | 0.4670787241790435 |
| PAMUSER_11 | 0.4549084917815740 |
| P000002 | 0.4530875803939192 |
| PAMUSER_03 | 0.4521016754727362 |
| P000011 | 0.4354257970522727 |
| PAMUSER_01 | 0.4227834465577827 |
| PAMUSER_12 | 0.4113462559016781 |

In Table 3, when considering only the highest similarity score, P000011 and PAMUSER_01 had the highest similarity scores, indicating those users are the least risky in the group. In Table 5, however, using the top-k mean approach, P000011 and PAMUSER_01 are among the riskiest users with the lowest similarity scores. As can be seen by inspecting Table 1, P000011 and PAMUSER_01 are very similar to each other. Using the top-k mean approach identifies both users as potentially risky, whereas only considering the top similarity score does not.

In some examples, both approaches are used. For example, after identifying the highest similarity score to a user, the top-k mean approach can be used to see if the similarity score changes more than a threshold amount (e.g., 5%, 10%, etc.). In other examples, one approach or the other is used.

The numerical results can be used in a variety of ways. For example, a risk score can be calculated as (1-mean similarity score of top k) or (1-highest similarity score), in which case the risk score ranges from 0 to 1 with higher scores representing riskier users. Alternatively, the similarity scores themselves can be used. In such situations, the score still ranges from 0 to 1 with the higher scores being less risky users.

Various actions can be taken based on the classification of a user as risky/not risky, high/moderate/low risk, etc. For example, high risk users can be prevented from establishing PAM sessions and requests for such sessions can be denied. High risk users can also have their actions monitored or audited periodically in PAM sessions. After a user has been classified as high risk, the user can be automatically locked from establishing future PAM sessions pending a manual override. In some examples, a notification or other message with a recommendation to grant/deny PAM session requests is generated and sent to a responsible party.

Similarity analysis and risk classification can be performed periodically and be used to generate a risk profile for the user group. In such examples, users can be classified as high risk or low risk on a monthly, quarterly, etc., basis, and the classification is stored in the user's risk profile or in a separate risk file or table. The risk profile can be consulted prior to granting future PAM session requests. Risk profiles can also be provided to a reviewer inspecting PAM logs for potential fraud. The reviewer can then focus first on the users indicated as being highest risk.

Figure 5:
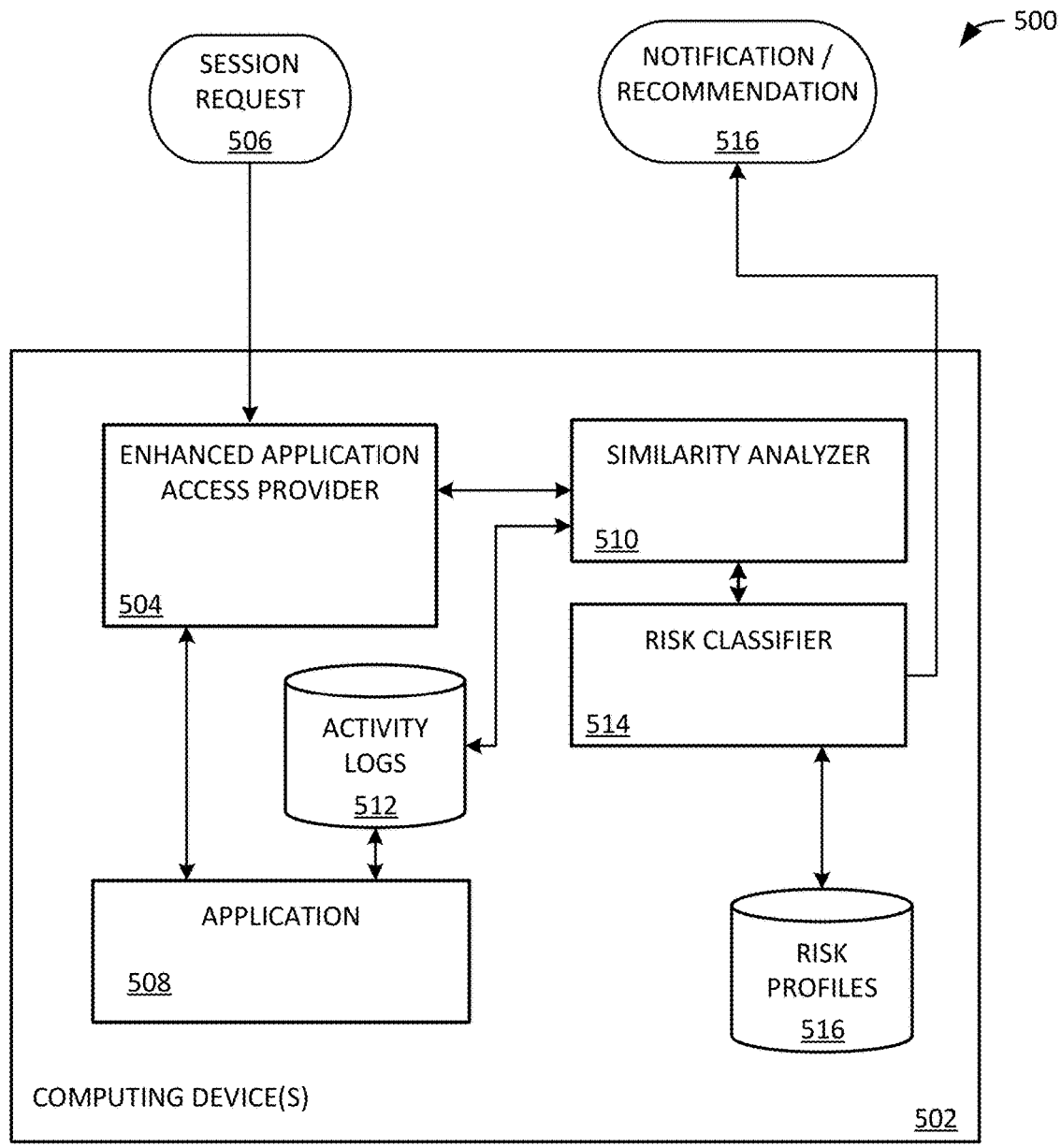
FIG. 5 illustrates an example system configured to assess risk through a similarity analysis.

FIG. 5 illustrates an example system 500 configured assess user risk and manage enhanced application access sessions. Computing device(s) 502, which can be one or more server computers and can be local computers or cloud devices, implement enhanced application access provider (provider) 504. Provider 504 receives a request 506 for an enhanced application access session (session) for a user that temporarily gives the user expanded privileges and access in application 508. Provider 504 manages permissions and access. Provider 504 instructs similarity analyzer 510 to perform a similarity analysis on the user's previous activity while in a session. Similarity analyzer 510 accesses activity logs 512, which can be stored transaction-by-transaction or aggregated by user.

Based on the information in activity logs 512, similarity analyzer 510 generates a bipartite graph (e.g., as shown in FIG. 3) relating users to application transactions performed in previous sessions. Similarity scores (e.g., as shown in Tables 3-5) can be generated from the bipartite graph. Risk classifier 514 applies one or more thresholds to the similarity scores to classify a user as, e.g., high or low risk. Risk classifier 514 can also compare a risk score (based on one or more similarity scores) to a threshold. As an example, a risk score can be calculated as (1-mean similarity score of top k) or (1-highest similarity score), in which case the risk score ranges from 0 to 1 with higher scores representing riskier users. Risk classifier 514 then generates a notification 516 or other message or a recommendation to approve or deny session request 506. In some examples, notification 516 is provided back to enhanced application access provider 504. In other examples, notification 516 is provided to a responsible party to confirm the recommended approval or denial.

In still other examples, notification 516 notifies a responsible party that session request 506 has been approved or denied by risk classifier 514.

In some examples, similarity analyzer 510 and risk classifier 514 periodically evaluate and classify a group of users and store risk profiles for the users in risk profile data store 518. The profiles can indicate a risk level (e.g., "high," "level 3," etc.). In some examples, provider 504 accesses risk profiles data store 516 to decide whether to grant session request 506.

Figure 6:
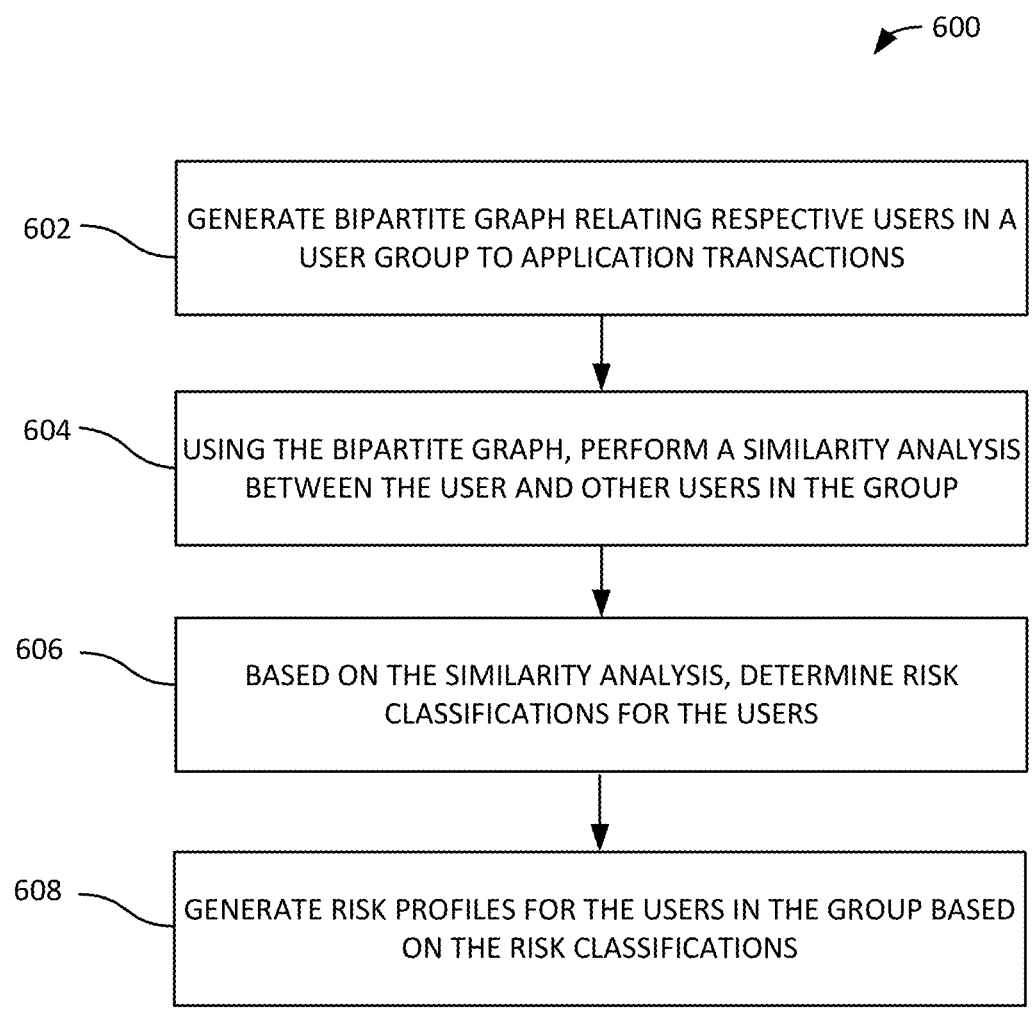
FIG. 6 illustrates an example user risk assessment method in which risk profiles are generated for a group of users.

FIG. 6 illustrates a risk assessment method 600. In process block 602, a bipartite graph is generated relating respective users in a user group to application transactions performed by the users during enhanced application access sessions. In process block 604, using the bipartite graph, for the respective users, a similarity analysis is performed for the respective users between the user and the other users in the group. In process block 606, risk classifications are determined for the users of the user group based on the similarity analyses. In process block 608, risk profiles are generated for the users in the user group based on the risk classifications.

Figure 7:
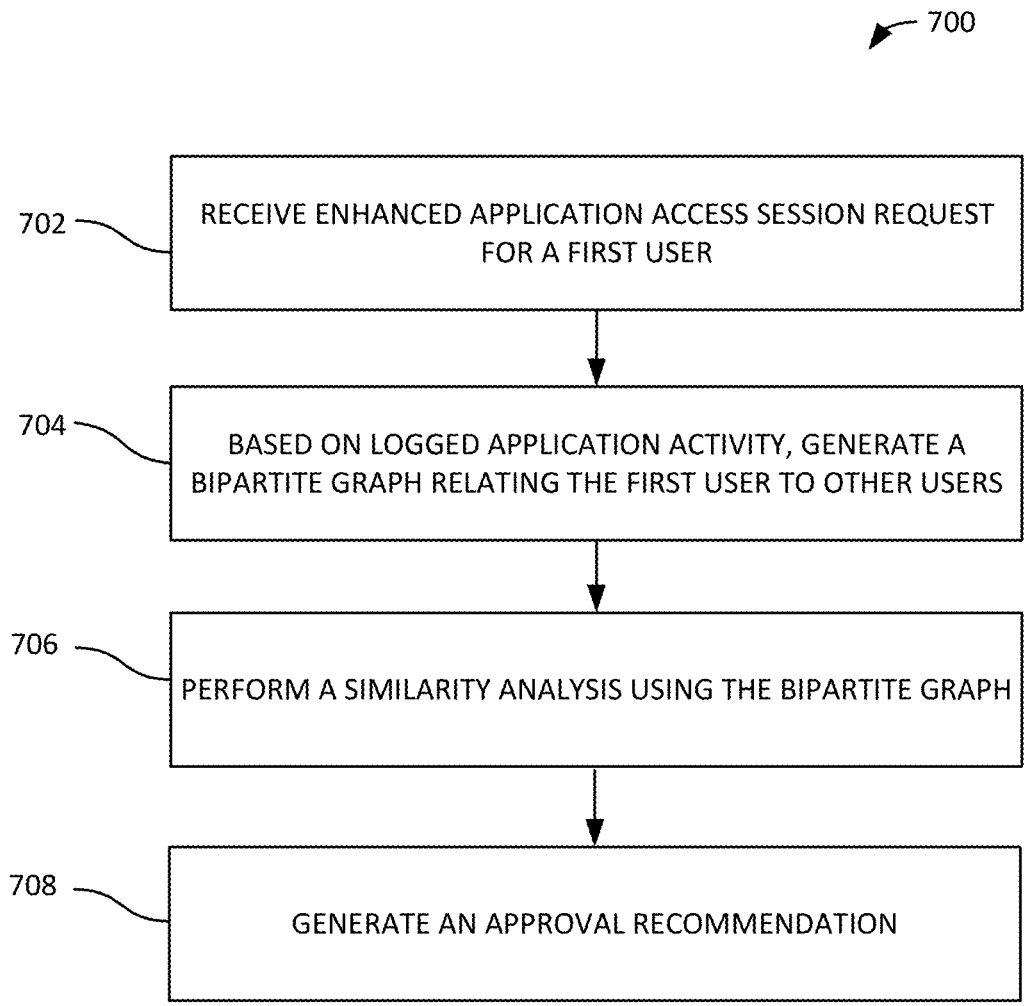
FIG. 7 illustrates an example user risk assessment method in which an approval recommendation for an enhanced application access session request is generated.

FIG. 7 illustrates a risk assessment method 700. In process block 702, an enhanced application access session request is received for a first user. The enhanced application access session temporarily grants the first user one or more of expanded permissions, expanded access to data, or expanded access to functionality. In process block 704, based on logged application activity for a group of users during previous enhanced application access sessions, a bipartite graph is generated relating the users in the group to application transactions performed by the users in the group during the enhanced application access sessions. The group includes the first user. In process block 706, a similarity analysis is performed using the bipartite graph. The similarity analysis compares application transactions performed by the first user to application transactions performed by other users in the group. In process block 708, an approval recommendation is generated for the enhanced application access session request based on the similarity analysis.

Example Computing Systems

Figure 8:
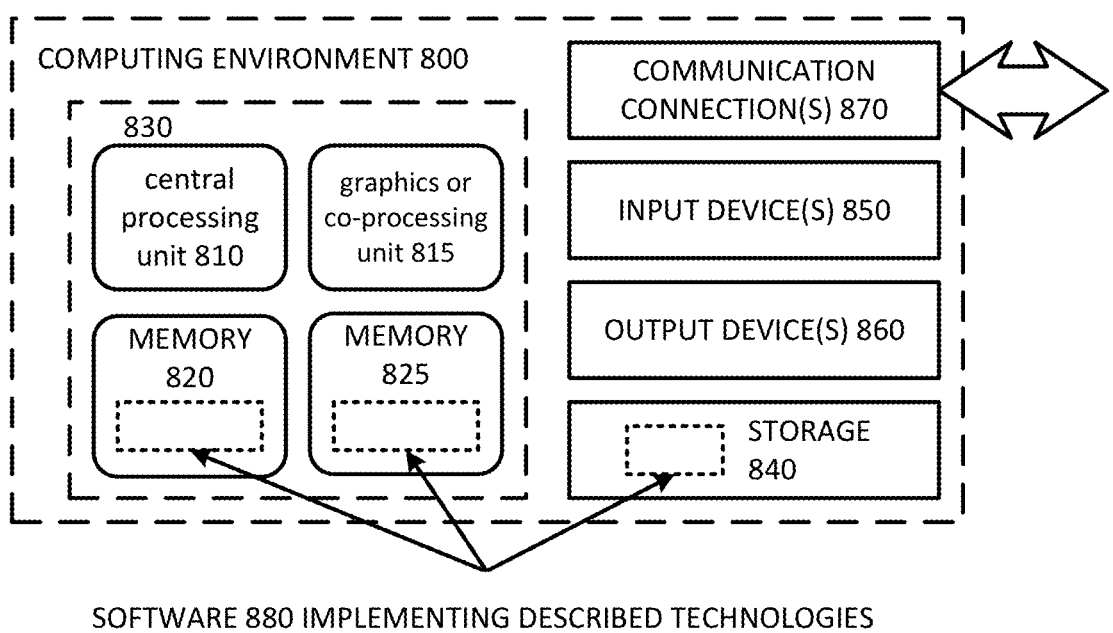
FIG. 8 is a diagram illustrating a generalized implementation environment in which some described examples can be implemented.

FIG. 8 depicts a generalized example of a suitable computing system 800 in which the described innovations may be implemented. The computing system 800 is not intended to suggest any limitation as to scope of use or functionality, as the innovations may be implemented in diverse general-purpose or special-purpose computing systems.

With reference to FIG. 8, the computing system 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

For example, memory 820 and 825 can store similarity analyzer 510 and risk classifier 514 of FIG. 5.

A computing system may have additional features. For example, the computing system 800 includes storage 840, one or more input devices 850, one or more output devices 860, and one or more communication connections 870. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 may be removable or non-removable, and includes magnetic disks, magnetic tapes or cassettes, CD-ROMs, DVDs, or any other medium which can be used to store information and which can be accessed within the computing system 800. The storage 840 stores instructions for the software 880 implementing one or more innovations described herein. For example, storage 840 can store similarity analyzer 510 and risk classifier 514 of FIG. 5.

The input device(s) 850 may be a touch input device such as a keyboard, mouse, pen, or trackball, a voice input device, a scanning device, or another device that provides input to the computing system 800. For video encoding, the input device(s) 850 may be a camera, video card, TV tuner card, or similar device that accepts video input in analog or digital form, or a CD-ROM or CD-RW that reads video samples into the computing system 800. The output device(s) 860 may be a display, printer, speaker, CD-writer, or another device that provides output from the computing system 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer and should not be confused with acts performed by a human being. The actual computer operations corresponding to these terms vary depending on implementation.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 8, computer-readable storage media include memory 820 and 825, and storage 840. The term computer-readable storage media does not include signals and carrier waves. In addition, the term computer-readable storage media does not include communication connections (e.g., 870).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

We claim:

1. A method, comprising:
  logging application activity for a group of users while the users have enhanced access to one or more applications;
  receiving a request for an enhanced access session for a first user in the group, wherein enhanced access comprises temporarily granting expanded permissions, access to additional functionality, or access to additional data;
  performing a similarity analysis based on the logged application activity, the similarity analysis comparing application activity of the first user in the group and application activity of other users in the group;
  based on the similarity analysis, determining a risk classification for the first user; and
  based on the risk classification, granting or denying the request for the enhanced access session for the first user in the group.

2. The method of claim 1, further comprising generating a notification based on the risk classification, the notification recommending whether to approve or deny an enhanced application access session for the first user.

3. The method of claim 1, wherein the similarity analysis identifies a subset of other users in the group having logged application activity most similar to the first user.

4. The method of claim 1, further comprising aggregating the logged application activity for the users.

5. The method of claim 4, further comprising generating a bipartite graph based on the aggregated application activity, the bipartite graph relating the users to application transactions, wherein the similarity analysis is performed on the bipartite graph.

6. The method of claim 5, wherein the users of the group form nodes of a first set, application transactions from the aggregated application activity form nodes of a second set, and edges of the bipartite graph connect the nodes of the first set and second set.

7. The method of claim 6, wherein the similarity analysis comprises comparing application transactions connected to the first user by edges of the bipartite graph to application transactions connected to other users of the group by edges of the bipartite graph.

8. The method of claim 1, wherein the similarity analysis comprises calculating numerical similarity scores for the first user relative to other users in the group.

9. The method of claim 8, wherein determining the risk classification comprises comparing one of the numerical similarity scores for the first user, a combination of multiple numerical similarity scores, or a risk score determined based on one or more of the similarity scores to a threshold, wherein a score on one side of the threshold indicates that the first user is lower risk, and wherein a score on the other side of the threshold indicates that the first user is higher risk.

10. The method of claim 9, further comprising upon determining that the threshold is exceeded, conditionally approving the first user for an enhanced application access session.

11. The method of claim 1, further comprising:
  performing similarity analyses and determining risk classifications for other users in the group; and
  generating risk profiles for the first user and other users in the group based on the risk classifications.

12. The method of claim 1, wherein the similarity analysis is performed after the request for an enhanced access session for the first user is received.

13. A system, comprising:
  at least one processor; and
  one or more computer-readable storage media storing computer-readable instructions that, when executed by the at least one processor, perform operations comprising:
  generating a bipartite graph relating users in a user group to application transactions performed by the users during enhanced application access sessions, wherein enhanced access comprises expanded permissions, access to additional functionality, or access to additional data;
  receiving a request for an enhanced access session for a first user in the user group;
  using the bipartite graph, performing, for the users, similarity analyses between the first user and other users in the user group;
  based on the similarity analyses, determining risk classifications for the users of the user group;
  generating risk profiles for the users in the user group based on the risk classifications; and
  based on the risk profiles, granting or denying the request for the enhanced access session for the first user in the user group.

14. The system of claim 13, wherein the risk profiles are updated periodically based on additional logged application activity.

15. The system of claim 13, wherein during an enhanced application access session, a user temporarily has increased permissions and greater access to data and functionality than the user normally has.

16. The system of claim 13, wherein:
  the respective users in the group form nodes of a first set, the application transactions performed by the users form nodes of a second set, and edges of the bipartite graph connect the nodes of the first set and second, and
  the similarity analyses comprise, for the respective users, comparing application transactions connected to the user by edges of the bipartite graph to application transactions connected to other users of the group by edges of the bipartite graph.

17. The system of claim 13, wherein the application transactions performed by the users during enhanced application access sessions are logged, aggregated by user, and used to generate the bipartite graph.

18. One or more computer storage devices storing computer-executable instructions for risk assessment, the risk assessment comprising:
- receiving an enhanced application access session request for a first user, wherein an enhanced application access session temporarily grants the first user one or more of expanded permissions, expanded access to data, or expanded access to functionality;
- based on logged application activity for a group of users, the group including the first user, during previous enhanced application access sessions, generating a bipartite graph relating the users in the group to application transactions performed by the users in the group during the enhanced application access sessions;
- performing a similarity analysis using the bipartite graph, the similarity analysis comparing application transactions performed by the first user to application transactions performed by other users in the group; and
- generating an approval recommendation for the enhanced application access session request based on the similarity analysis.

19. The computer storage devices of claim 18, wherein performing the similarity analysis comprises:
- calculating similarity scores for the other users in the group relative to the first user, the similarity scores indicating a similarity between the transactions performed by the other users and the transactions performed by the first user; and
- determining a risk score based on a mean of a subset of the similarity scores that indicate greatest similarity to the first user, wherein the risk score is used to generate the approval recommendation.

* * * * *